Oct. 20, 1953 — L. S. LONGENECKER — 2,656,055
MEANS FOR CHARGING SCRAP METAL
Filed July 5, 1951 — 4 Sheets-Sheet 1

INVENTOR.
Levi S. Longenecker
BY
HIS ATTORNEYS

Oct. 20, 1953    L. S. LONGENECKER    2,656,055
MEANS FOR CHARGING SCRAP METAL
Filed July 5, 1951    4 Sheets-Sheet 2

INVENTOR.
Levi S. Longenecker
BY
HIS ATTORNEYS

Oct. 20, 1953     L. S. LONGENECKER     2,656,055
MEANS FOR CHARGING SCRAP METAL
Filed July 5, 1951     4 Sheets-Sheet 3

INVENTOR.
Levi S. Longenecker
BY
HIS ATTORNEYS

Oct. 20, 1953     L. S. LONGENECKER     2,656,055
MEANS FOR CHARGING SCRAP METAL
Filed July 5, 1951     4 Sheets-Sheet 4
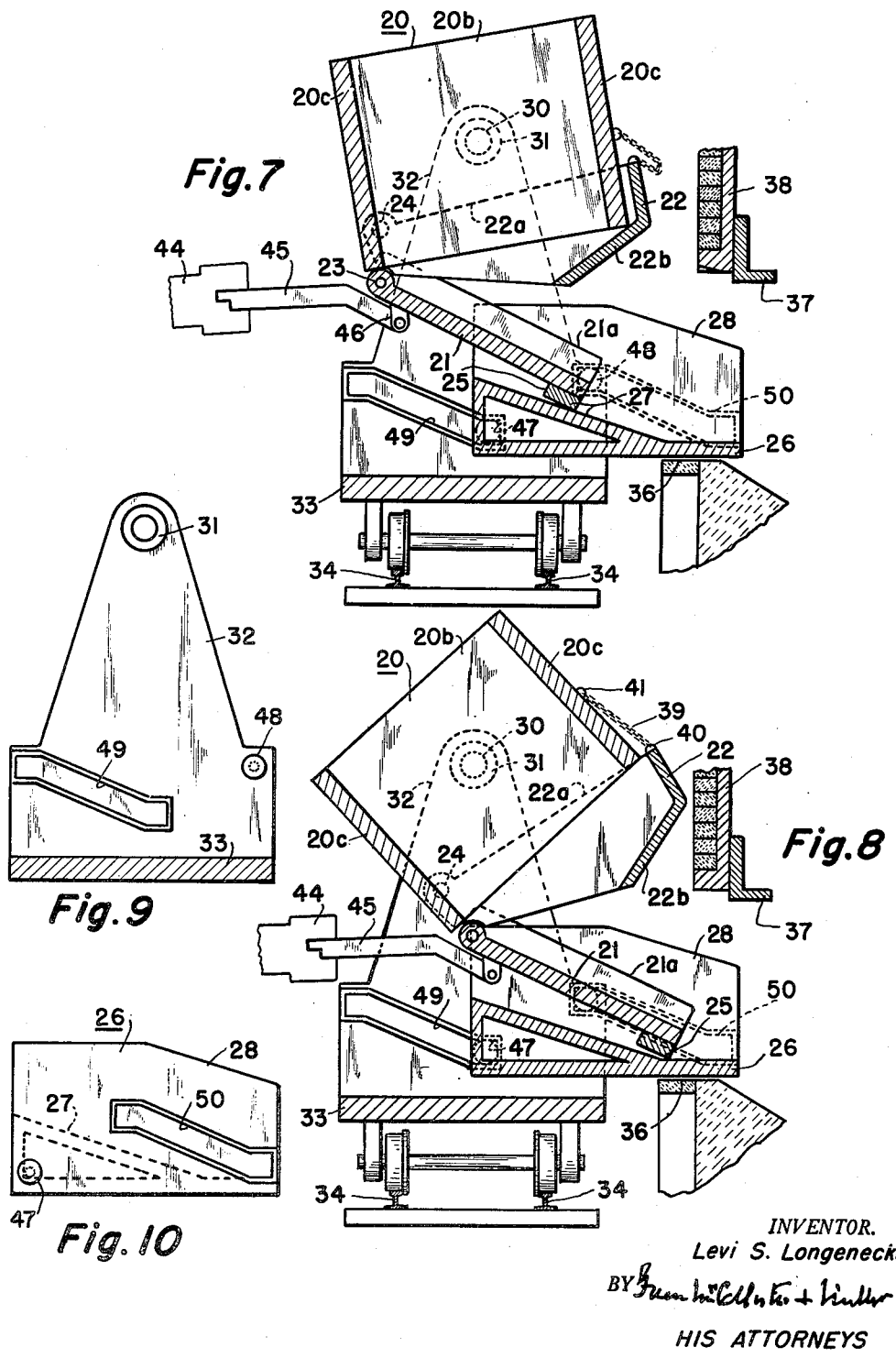
INVENTOR.
Levi S. Longenecker
BY
HIS ATTORNEYS Patented Oct. 20, 1953

2,656,055

UNITED STATES PATENT OFFICE 2,656,055

MEANS FOR CHARGING SCRAP METAL

Levi S. Longenecker, Pittsburgh, Pa.

Application July 5, 1951, Serial No. 235,291

13 Claims. (Cl. 214—18)

This invention relates to open hearth furnaces and more particularly to the charging of such furnaces with relatively light bulky material such as steel scrap.

Present day open hearth plants have charging machines comprising a truck, which travels on an extra wide gauge track which parallels the plane of the front walls of the furnaces. This machine is provided with a charging carriage which moves toward and from the furnaces or at right angles to the direction of travel of the truck itself.

The carriage is provided with a long arm, known as a peel or charging bar, which extends toward the furnace, is hollow, can be made to revolve and is shaped on its furnace end to fit into the sockets of charging boxes in which the scrap is carried to position in front of the furnaces.

These charging boxes rest on buggies running on either a standard gauge or a narrow gauge track which parallels the track of the charging machine and is located between the charging machine track and the furnaces.

Each of the present day charging boxes has a capacity of about 35 cubic feet and since the weight of the scrap is about 60 pounds per cubic foot, the weight of the contents of each box averages about 2000 pounds. This means that for a charge of 120 tons, there are 120 boxes and since there are generally four boxes per buggy, it will require 30 buggies which will make a train about 400 feet long.

At the present time, a typical scrap charging of a furnace requiring 120 tons of scrap is as follows:

First the truck of the charging machine is moved so that the charging bar is directly opposite the charging box which is to be emptied. Its carriage is then moved forward so as to bring the end of the charging bar into position to be dropped into a socket in the end of the charging box. The charging box is then locked in position and the charging bar is raised carrying the box with it. By a forward motion of the carriage, the box is then moved into the furnace where, by rotating the charging bar, the box is turned upside down and its contents deposited.

This operation is then reversed and the empty box is placed back in position on its buggy.

This operation is repeated with each of the 120 boxes of the train.

An object of this invention is to provide a method and means that will materially cut down the time required for charging scrap metal to an open hearth furnace.

Another object is to provide an improved method of charging scrap metal to an open hearth furnace.

Another object is to produce an improved box that is capable of holding as much as about 1000 cubic feet of scrap metal, can be carried on a standard gauge buggy and be readily delivered through the furnace charging opening.

These and other objects which will be apparent to those skilled in this art, I attain by means of the structure described in the specification and illustrated in the drawings accompanying and forming part of this application.

Figure 4:
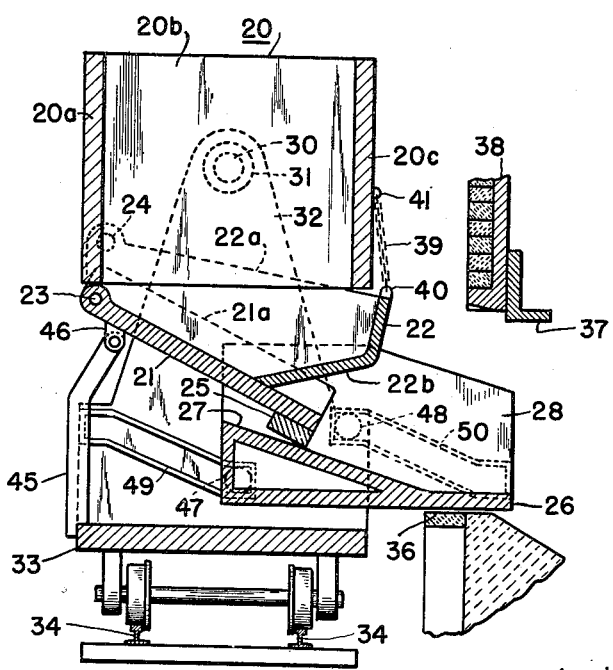
Figure 5:
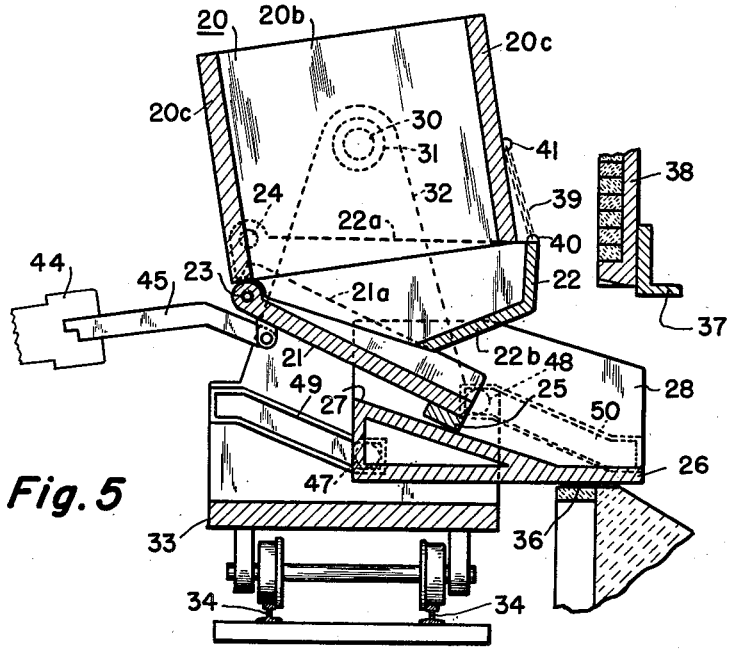
Figure 6:
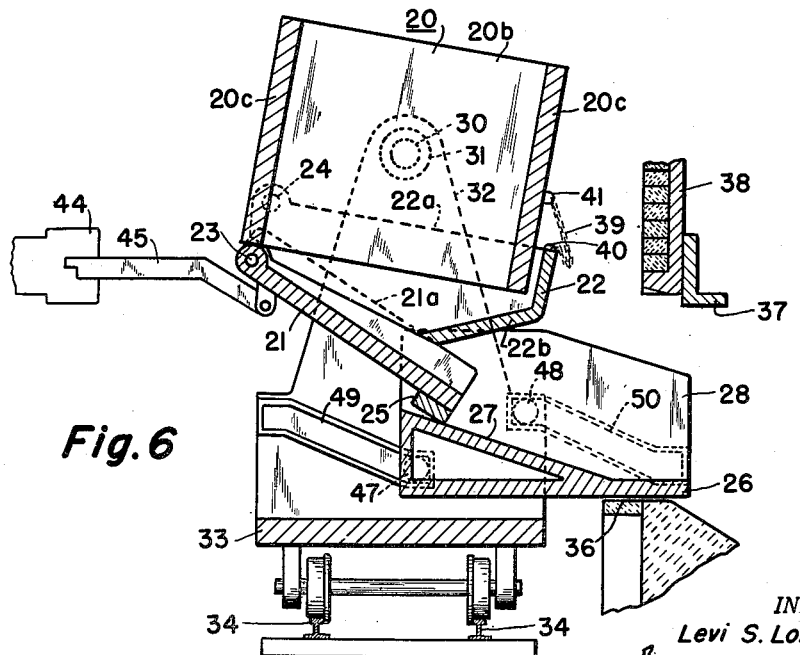

Fig. 4 is a sectional elevation and more or less diagrammatically shows the scrap charging means of this invention as it will appear when containing a charge of scrap, when in position in front of the furnace to be charged and when its chute-like member has been moved laterally and lowered to bridge the gap between the buggy supporting the charging means, container or box and the sill of the furnace charging opening;

Figs. 5 to 8 inclusive are similar views to Fig. 4, but depict the rocking of the scrap container about its horizontal axis during a charging cycle. These views show the operation of the visor or hold-back member forming part of the container floor;

Fig. 9 is an end elevation showing the inner face of one of the end supports of the container; and Fig. 10 is a side view in elevation of the chute-like pan used in bridging the space between the container supporting buggy and the sill of the furnace charging opening.

The method of this invention in its broadest aspect comprises collecting a relatively large charge of scrap metal, supporting the same in a box-like container in front of the furnace charging opening with the bottom of the scrap charge located a distance above the sill of such charging opening, in bridging the space between the bottom of such charge and such charging opening sill with a trough-like member and rocking such charge about a horizontal axis that parallels the furnace wall equipped with such charging opening and during such rocking, in detaching bottom segments of such charge from its off-furnace side while holding back the furnace-side of such charge, causing the detached segments to move onto such trough-like member and pushing such segments along such trough-like member and into the furnace charging opening in a step by step manner.

For the purpose of facilitating the carrying out of such method, I preferably employ a rockable container such as more or less diagrammatically illustrated in the drawings.

This container preferably takes the form of a rectangular box-like body 20 having an open top and a bottom comprising two members 21 and 22 each pivotally connected to the container body 20 adjacent its off-furnace side. Member 21 is hinged to the body at the lower end of its off-furnace side wall 20a as at 23, while member 22 which takes the form of a visor is pivotally connected to end walls 20b at 24 adjacent the bottom of the box-like body but slightly above the hinge points 23 of member 21.

Figure 1:
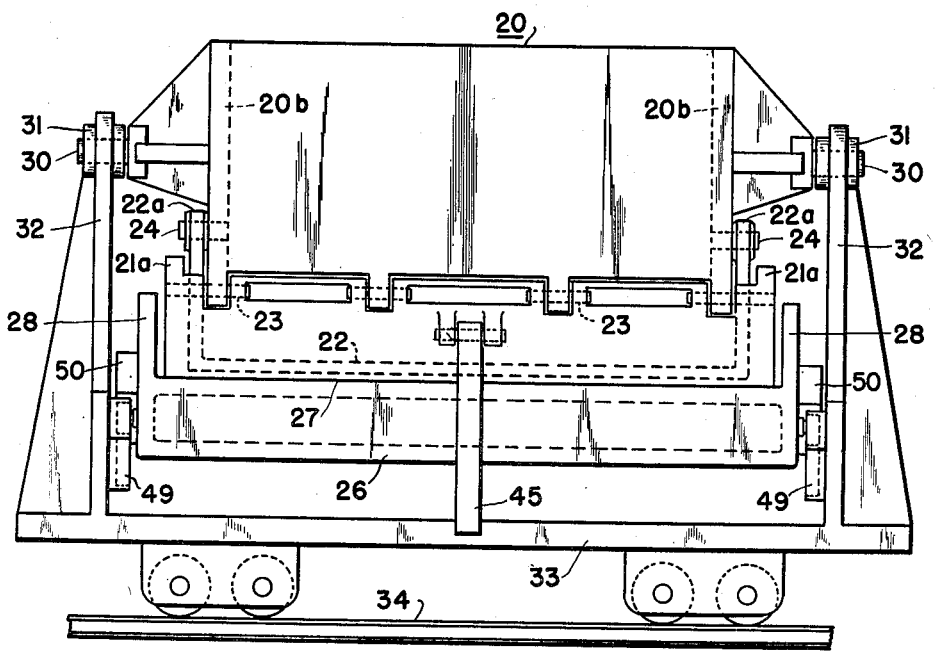
Figure 1 is an elevational view looking toward the front or off-furnace side of a scrap charging device by means of which the method of this invention can be readily carried out.

Each of the members 21 and 22 has vertically extending side walls which are respectively numbered 21a and 22a. Visor member 22 lies within member 21 which may be termed a pusher member. The side members 21a of this pusher member 21 lie outside of the side walls 22a of the visor member as clearly shown in Fig. 1. The sides 22a of the visor member lie outside of the end walls 20b of the box-like container body 20.

Pusher member 21 having a pad 25 secured to its underside at its distal end, in order to make it a more effective pusher, lies within a trough-like member 26 having an inclined floor portion 27 and vertically extending side walls 28. This trough sometimes referred to as a pan, is but slightly narrower than the width of the furnace charging opening as shown at 29 in Fig. 3.

Box-like container 20 is provided with trunnions 30 which are journaled within bearings 31 carried by end members 32 which are secured to and project upwardly from the floor or platform 33 of one of the buggies which is adapted to be moved along rails 34 which parallel the front wall 35 of the furnace.

The still of the charging opening is numbered 36 and 29 indicates the clearance between the sides of the charging opening and the sides 28 of pan or trough-like member 26.

The lintel above the charging opening is numbered 37 and the door controlling the charging opening is numbered 38.

Figure 2:
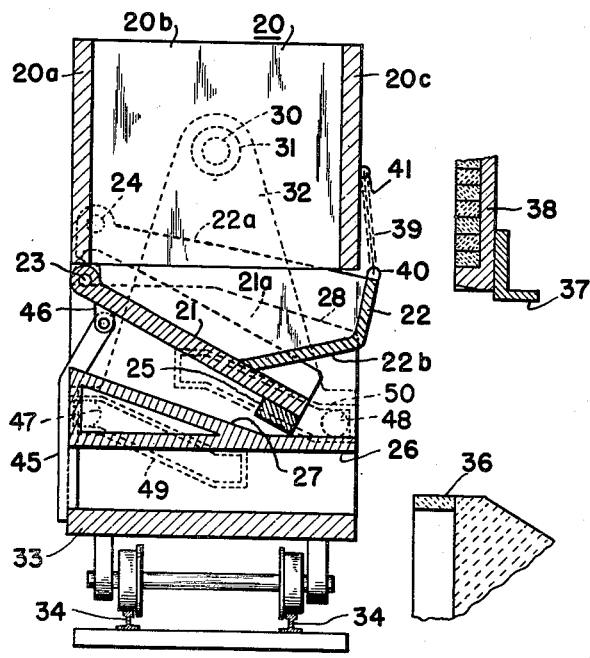
Fig. 2 is a side sectional elevation of the device of Fig. 1 and discloses its relation with regard to the furnace charging opening.

Visor member 22 is provided with an angled bottom portion 22b. When floor members 21 and 22 (pusher and visor members) are in normal position, with the box-like container 20 either empty or loaded with scrap metal, they meet as shown in Fig. 2 and close the bottom of the box-like container.

Downward motion of visor member 22 with relation to furnace side wall 20c of the box-like body of the container 20 is limited by a chain 39 which is secured to the top edge 40 of the visor member 22 and to furnace-side wall 20c at 41. This chain permits considerable upward relative motion of the visor member 22 with relation to furnace-side wall 20c as is disclosed in Figs. 6 and 7. In Fig. 7, it is assumed that the visor member is held at the upper limit of its travel with relation to furnace-side wall 20c by scrap metal which is caught between the bottom of the visor member and the floor portion of the pusher member.

The charging machine is numbered 42 and one of the pair of rails on which the same is mounted is numbered 43. The peel of the charging machine is numbered 44.

An arm 45 is pivoted to a preferably rigid projection 46 of pusher member 21. Arm 45 can be connected to peel 44 by suitable means (not shown) and when box-like container 20 is to be loaded with scrap, or is to be moved to and from position in front of the charging opening of the furnace, it can serve as a prop and can engage the floor or platform 33 of the buggy to hold the container in upright position as in Fig. 2.

Trough-like member or pan 26 is supported by two sets of rollers 47 and 48 which are arranged to roll within two pairs of guideways 49 and 50, each having an inclined portion as shown in Figs. 9 and 10. Rollers 47 which extend outwardly from the sides of trough-like member 26 operate within raceways 49 which are formed in or extend outwardly from the inner faces of members 32; while rollers 48 which are secured to such inner faces, operate within raceways 50 which are formed in or extend outwardly from the sides of trough-like member 26.

Figure 3:
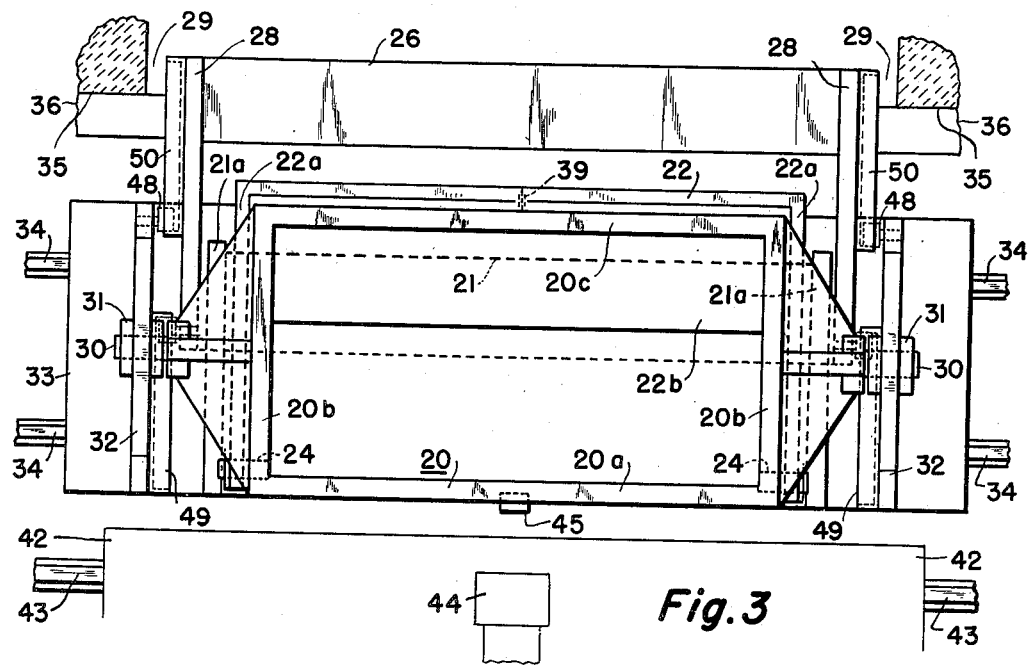
Fig. 3 is a top plan view of the device of Figs. 1 and 2.

While box-like container 20 is being loaded with scrap and while the buggy supporting the same is being moved along track 34, trough-like member or pan 26 is in raised position as shown in Figure 2. When the buggy reaches a position where the trough-like member or pan 26 lines up with the furnace charging opening, as shown in Figure 3, member 26 is moved laterally of the buggy, preferably by the peel of the charging machine. During such movement, because of the inclined portions of raceways 49 and 50, member 26 is lowered so that the furnace end thereof rests on sill 36 of the furnace charging opening, as shown in Figures 4–8 inclusive.

The rocker type scrap charger of this invention is adapted to be mounted on the platform of a standard buggy operating on a standard gauge track. Trough-like member or pan 26 is designed to enter the furnace charging opening with relatively small clearances 29 between its sides and the sides of such charging opening as shown in Figure 3. The furnace charging opening preferably has a width of at least 21 feet 6 inches and is preferably controlled by three tilt lift furnace doors of the type broadly disclosed in Patent 2,045,662 granted to me June 30, 1936; such doors being preferably operated by the operating mechanism of Patent 2,494,713 granted me January 17, 1950.

After trough-like member or pan 26 has been pushed forward or laterally of the buggy into the furnace charging opening, arm 45 is raised (freeing the container for rocking movement) and is connected to peel 44 of the charging machine.

The operator of the charging machine now causes it to rock box-like container 20 forward and backward or toward and from the furnace about its pivotal axis. The forward movement (Figs. 5, 7 and 8) raises the visor 22 which causes part of the off-furnace side of the scrap charge to slide down pusher member or element 21 and move into trough-like member or pan 26. This forward movement also moves pusher member 21 toward the furnace which carries and pushes the scrap through the trough-like member 26 into the furnace in a step by step manner.

The backward movement (Fig. 6) of the box-like container causes the visor supporting chain to act as a lost motion connection between the visor and the adjacent wall of container 20, thus allowing the scrap caught between it (the visor) and the pusher elements or members to raise the visor with relation to such wall. A feature of this backward movement is that it pulls the pusher member from under the scrap resting on its upper surface and causes a segment of such scrap from the off-furnace side thereof to fall or move down in front of the distal or pusher end or nose 25.

The width of pusher element 21 is considerably greater than the length of container 20 and but slightly less than the width of trough-like member 26. Because of this, the scrap in moving from container 20 onto pusher member 21 and thence into trough-like member 26 is allowed to loosen up. This loosening up and spreading out gives the scrap more freedom to fall down the incline comprising the floor of pusher member 21 and the inclined portion 27 of the trough-like member 26.

During the whole charging cycle, the scrap is always free to spread out lengthwise of the pusher and pan or trough-like member 26 and move forward so that there is very little tendency to develop any heavy scrap compression loads which might cause binding and stalling.

It will be seen that at each forward and back movement of the container 20, the charging machine is only working on a relatively small part of the complete scrap load and at no time during the charging cycle is the charging machine called upon to do any lifting of the scrap load.

Contact of the sill of the furnace charging opening by the trough-like member or pan 26 helps to laterally brace the buggy and the supports 32 of the box-like container. If found necessary, additional bracing can be obtained by connecting the platform 33 of the buggy or supports 32 of the box-like container to the charging machine.

If there is any tendency for the scrap to hang up on the inclined pusher, its degree of inclination can be increased by locating the box-like container 20 at a higher elevation.

The visor element serves as a control gate which prevents the complete charge from falling down into the furnace charging opening where its bulk would considerably exceed the size of the charging opening and thus cause jamming. The visor element also serves as a leveling device which keeps the topmost scrap from fouling the lintel of the charging opening.

It will be apparent that material other than scrap metal may be moved into and through a furnace charging opening in accordance with the method of this invention and by means of the device disclosed in the drawings.

The method of this invention can be carried out by means of a device such as illustrated in the drawings even though the visor element 22 is rigidly connected to the side and end members of the box-like container. Such a device, however, will not be nearly as effective as the device shown in the drawings in which the visor element is pivotally connected to the box-like container body adjacent its off-furnace side and has its distal end connected to the furnace-side 20c of the box-like container body 20 by a lost motion device, such as chain 39.

The amplitude of movement of the container during rocking thereof will be less than with the container having the pivotally mounted visor and the rate of discharge of scrap metal from the container will necessarily be slower than with the structure of the drawings in which the bottom opening between the lower end of the visor element and pusher element 21 varies automatically.

While we speak of detaching segments from the scrap charge on its off-furnace side, it will be understood that most of the time during operation of my scrap charger there will be no sharp line of demarcation between one segment and a following or preceding segment of scrap.

The visor element holds back the furnace side of the scrap charge, while the off-furnace side of the charge rests on the inclined pusher element. When the top of the container is rocked toward the furnace, the pusher element is pulled from under that portion of the scrap charge which rests thereon. Part of the charge on the off-furnace side is thus caused to move onto the inclined portion of the trough-like member.

Now, when the container is rocked in the opposite direction, that is, when the top of the container moves away from the furnace, the detached segment of the scrap charge is caused to move onto the inclined portion of the floor of the trough-like member and is pushed along such trough-like member toward the furnace charging opening.

The scrap segments which are thus caused to move onto the floor of the trough-like member are moved in a step by step manner toward the furnace charging opening, even though they are only partially detached from the scrap charge within the container.

What I claim is:

1. A device for charging material into a charging opening of a furnace which comprises, a container for supporting a charge of material in front of the charging opening, material delivery means operatively associated with said container to bridge the spacing between a bottom portion of said container and the charging opening, and rocker means to actuate said container with respect to said delivery means and discharge material from said container to said delivery means and into the charging opening.

2. A device for charging material into a charging opening of a furnace which comprises, a container for supporting a charge of material in front of the charging opening, material delivery means operatively associated with said container to bridge the spacing between a bottom portion of said container and the charging opening, material advancing means operatively associated with the bottom portion of said container and with said delivery means, and means for actuating said material advancing means to discharge material from said container to said delivery means and to advance the material along the delivery means into the charging opening.

3. A device for charging material into a charging opening of a furnace which comprises, a container for supporting a charge of the material in front of the charging opening, a pair of bottom members operatively mounted on said container to normally retain the material within said container, rocker means for said container to actuate said pair of bottom members and discharge material therefrom towards the charging opening, and means to receive the discharged material and deliver it into the charging opening.

4. A device as defined in claim 3 wherein, said pair of bottom members are pivotally mounted for swinging movement with respect to said container, and said container is pivotally mounted on a carriage.

5. A device as defined in claim 3 wherein said means for receiving the discharged material is a trough-like member positioned below said pair of bottom members and is movable outwardly from said container into the charging opening.

6. A device for charging material along a sill of a charging opening of a furnace which comprises, a material carrying container positioned on a carriage for movement with respect to the furnace into charging alignment with the charging opening thereof, a delivery trough operatively positioned on said carriage for movement into the charging opening to rest upon the furnace sill, a pair of co-operating bottom support members swingably mounted on said container to normally hold the material within said container, and means for actuating said bottom support members with respect to said container and said delivery means to discharge material from said container upon said delivery means and to advance the material along said delivery means into the charging opening.

7. A device as defined in claim 6 wherein roller means operatively positions said delivery means for movement with respect to said carriage into the charging opening, a locking arm is operatively connected to one of said bottom support members to latch with said carriage and hold said pair of bottom support members in their normally closed relationship, and said arm being movable to an unlatched position to actuate said container and said bottom support members to discharge material from said container and advance it along said delivery means into the charging opening.

8. Means for charging material to a furnace through a charging opening in a substantially vertical wall thereof; such means comprising a container adapted to be carried on a buggy and mounted for rocking movement about a horizontal axis toward and from such furnace wall; such container comprising a box-like body having a bottom member which is pivotally connected to such box-like body adjacent its off-furnace side, is normally inclined downwardly from its pivotal axis to its distal end and is provided with upstanding side members, and a trough-like member adapted for movement laterally of such buggy below such container for bridging the space between such buggy and such furnace charging opening, such member being provided with upstanding sides and a floor which supports the distal end of the bottom member of the container body; the construction and arrangement being such that as the container, after such trough-like member is moved into position resting on the charging opening sill and the box-like container is rocked about its pivotal axis from and toward the furnace charging opening, bottom segments of the material charge will be separated from the main body within the container and pushed along such trough-like member toward and through the furnace charging opening in a step by step manner.

9. Means for charging scrap metal to an open hearth furnace through a door controlled opening in a substantially vertical wall thereof; such scrap charging means comprising a container mounted for rocking movement about a horizontal axis which parallels such furnace wall; such container comprising a box-like body having an open top and a bottom comprising two independent members each having vertically extending sides and each being pivotally connected to such box-like body adjacent its off-furnace side, one such member being free to move up and down about its pivotal axis and normally inclining downwardly from such axis to its distal end serves as a scrap slide and pusher, the other member comprised in such container bottom having movement of its distal end away from such box-like body limited by flexible means attached thereto and to such box-like body above the bottom of its furnace-side serves as a visor for controlling the discharge opening in the container bottom, and a trough-like member located below such container and mounted for movement laterally thereof for bridging the space between the bottom of such container and the sill of such furnace charging opening; the construction and arrangement being such that as the container, after such trough-like member is moved into position resting on the charging opening sill, and the box-like container is rocked about its pivotal axis from and toward the furnace charging opening, bottom segments of the scrap charge will be separated from the main scrap body within the container and pushed along such trough-like member toward and through the furnace charging opening in a step by step manner.

10. A device as defined in claim 9, in which the trough-like member used for bridging the space between the bottom of the scrap container and the sill of the furnace charging opening is provided with a floor portion which inclines downwardly from its off-furnace end to the furnace end thereof.

11. A device as defined in claim 9, in which the trough-like member used for bridging the space between the bottom of the scrap container and the sill of the furnace charging opening is supported on rollers operating in guideways having inclined portions whereby the trough-like member when moving laterally to bridging position is lowered.

12. A device as defined in claim 9, in which the flexible means limiting the movement of the distal end of the visor member away from the box-like container body takes the form of a chain.

13. A device as defined in claim 9, in which the horizontal axis about which the container is mounted for rocking movement is located above the vertical center of the container.

LEVI S. LONGENECKER.

No references cited.